United States Patent [19]
Demar et al.

[11] Patent Number: 5,462,155
[45] Date of Patent: Oct. 31, 1995

[54] LINEAR VIBRATORY CONVEYOR

[75] Inventors: Adelbert Demar, Grossbardorf; Wolfgang Ebner, Saal; Horst Meinfelder, Seidingstadt; Josef Köberlein, Bad Königshofen, all of Germany

[73] Assignee: Josef Koberlein Maschinen- und Vorrichtungsbau, Germany

[21] Appl. No.: 285,064

[22] Filed: Aug. 3, 1994

[30] Foreign Application Priority Data

Aug. 4, 1993 [DE] Germany ............................ 43 26 146.9

[51] Int. Cl.$^6$ .................................................. B65G 27/28
[52] U.S. Cl. ........................................ 198/760; 198/752.1
[58] Field of Search ...................................... 198/752, 758, 198/759, 760

[56] References Cited

U.S. PATENT DOCUMENTS

| | | | |
|---|---|---|---|
| 2,797,796 | 7/1957 | Carrier, Jr. et al. | 198/760 X |
| 3,238,798 | 3/1966 | Yeasting | 198/759 X |
| 5,285,890 | 2/1994 | Stearns | 198/752 X |

FOREIGN PATENT DOCUMENTS

| | | | |
|---|---|---|---|
| 0578842 | 1/1994 | European Pat. Off. | 198/752 |
| 0763890 | 1/1954 | Germany. | |
| 1025801 | 3/1958 | Germany. | |
| 2510292 | 9/1976 | Germany. | |
| 2051626 | 8/1979 | Germany | 198/760 |
| 0257737 | 1/1986 | Germany. | |
| 4016877 | 11/1991 | Germany | 198/760 |
| 4138957 | 7/1992 | Germany. | |
| 0563336 | 7/1977 | U.S.S.R.. | |
| 2086003 | 5/1982 | United Kingdom | 198/760 |

*Primary Examiner*—James R. Bidwell
*Attorney, Agent, or Firm*—Laff, Whitesel, Conte & Saret, Ltd.

[57] ABSTRACT

A linear vibratory conveyor has a bottom plate and a vibratory conveyor track. Together with a trimming weight, the latter forms a vibrating mass. Further, a countermass is provided forming a mass vibrating in an opposite direction. The support of the masses, vibrating reciprocally, referred to the bottom plate takes place by way of spring elements formed by leaf springs. An electromagnetic vibratory drive fed by a cycled d-c potential engages between the masses vibrating reciprocally. A coupler of elastically damped action is provided between the masses vibrating reciprocally for the masses to vibrate exactly reciprocally one referred to the other even when out of resonance.

8 Claims, 6 Drawing Sheets

LINEAR VIBRATORY CONVEYOR

BACKGROUND OF THE INVENTION

1. Field of the Invention

The invention relates to a linear vibratory conveyor, namely a vibroconveyor conveying workpieces substantially linearly.

2. Background Art

DD 257 737 A3 discloses a linear vibratory conveyor for the transport of workpieces and in particular for the transport of workpieces of comparatively small dimensions that are to be lead to a certain work station in automatic manufacturing and assembly installations. In this case, a useful mass is formed by a vibrating case as well as the armature of an electromagnet and a conveying and storing duct. Further, a countermass of approximately the same size is provided to consist of a vibrating frame arranged in the vibrating case as well as of an electromagnet core. The centers of gravity of these two masses are on a working line of the vibratory drive. Slotted leaf springs obliquely arranged, on which the vibrating case as well as the vibrating frame are screwed at predetermined positions, serve for the attachment of the vibrating components on a base plate. The vibratory drive has a vibration axis extending in parallel to the conveying duct. The leaf springs are arranged to be inclined by some angle referred to the vibrating case on the one hand and the vibrating frame on the other. These measures serve to create an improved linear vibratory conveyor of trouble-free functioning and by the use of which no foundation vibrations are to occur. However, this cannot be attained in the case of varying conveying speeds.

A linear vibratory conveyor of the same basic structure is known from DE 41 38 957 A1.

SUMMARY OF THE INVENTION

It is an object of the invention to embody a linear vibratory conveyor such that it operates steadily at any conveying speed.

According to the invention this object is solved by the features comprising a bottom plate, a vibrating conveyor track, spring elements disposed between the bottom plate and the vibrating conveyor track, a trimming weight linked to the vibrating conveyor track and substantially determining a vibrating mass, a countermass substantially determining another vibrating mass, spring elements arranged between the bottom plate and the countermass, a vibratory drive engaging with the one mass on the one hand and with the other mass on the other hand, and a coupler engaging between the one vibrating mass and the other vibrating mass and enforcing reciprocal vibration. The coupler between the two vibration masses ensures that the two vibrating masses vibrate in precisely opposite directions even out of a resonant vibration.

The measures according to which the axis of vibration of the vibratory drive is directed approximately through a common center of gravity of the one mass and the other mass serve to ensure that the entire system substantially consisting of the two vibrating masses operates neutrally and free from torque, so that no forces are exercised on a bottom plate or a foundation plate, respectively. This effect is still improved in that the axis of vibration of the vibratory drive extends about parallel to the direction of deflection of the spring elements.

An embodiment of a coupler consists in that the coupler has a coupler case torsionally vibratable about a stationary axis in relation to the bottom plate and linked to the one mass and the other mass by way of a connecting rod in each case. An embodiment free from wear and maintenance and not requiring lubrication consists in that the coupler case is supported on an abutment which is stationary in relation to the bottom plate and in that the coupler case is torsionally vibratable in an elastically damped manner. Devices of this type are known as machine elements, for instance of the company of Rosta-Werk AG of CH-5502 Hunzenschwil/ Switzerland.

The configuration of the vibratory drive, according to which the latter is configured as a drive acting electromagnetically and according to which the vibratory drive is excitable by a cycled d-c voltage, the d-c voltage being adjustable by a frequency transformer, ensures an infinitely variable control of the conveying speed ranging from 0 to a higher conveying speed of for instance 15 m/min.

As a result of the further development, according to which the leaf springs have their full cross-sectional area at their ends and are linked with the bottom plate on the one hand and with the one mass on the other hand and with the other mass on the other hand by means of a clamping equipment, the leaf springs are not subject to any wear because they are not subject to diminution where fixed.

The omission of the leaf springs and the adjustment and the excitation of the vibratory drive can each be used independently of the coupler.

Further details, advantages and features of the invention will become apparent from the ensuing description of an example of embodiment taken in conjunction with the drawing.

DESCRIPTION OF THE PREFERRED EMBODIMENT

Figure 1:
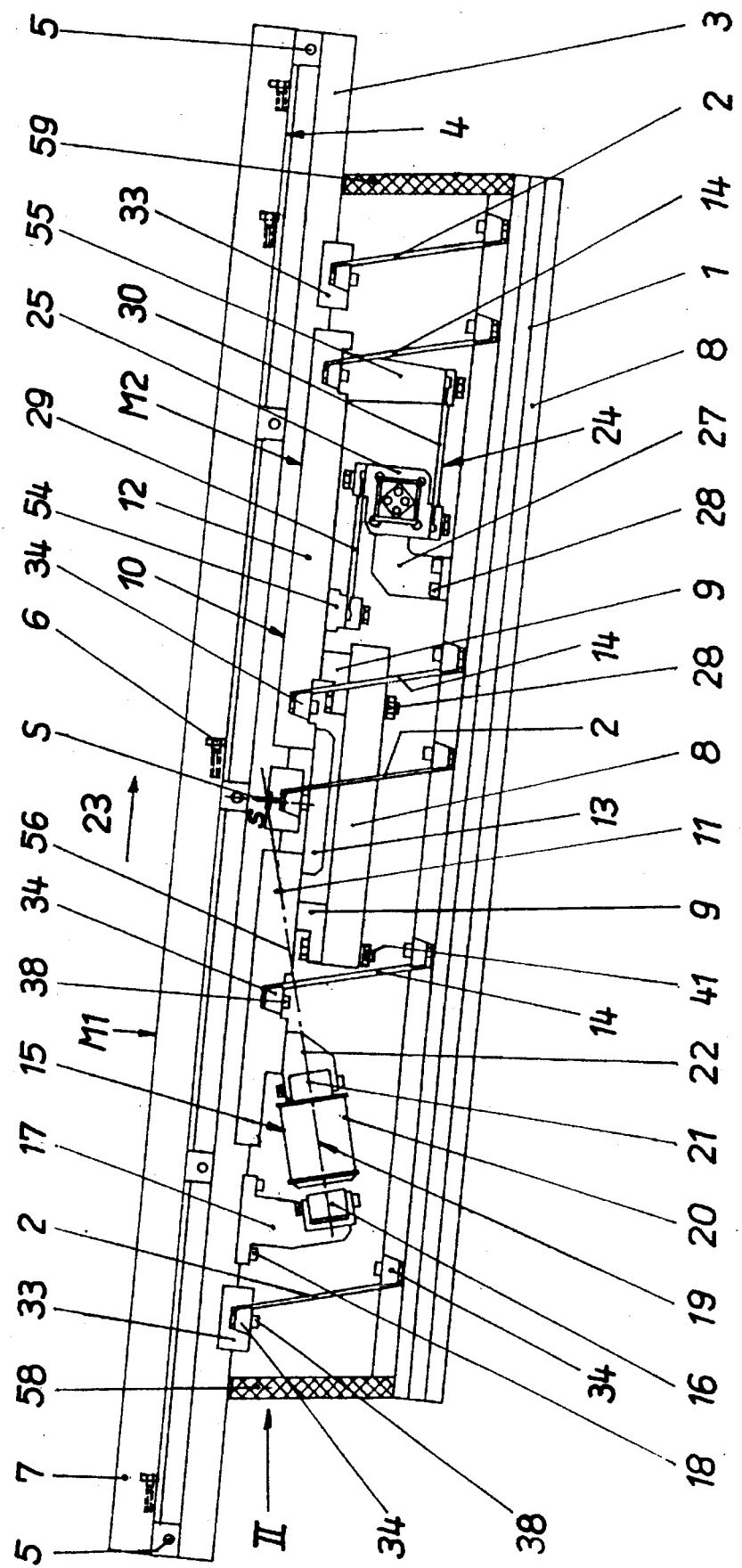
FIG. 1 is a lateral longitudinal view of a linear vibratory conveyor with the side walls removed.

The basic structure of a linear vibratory conveyor, hereinafter referred to as a vibroconveyor to simplify matters, is visible from FIG. 1. A vibrating bar 3 is supported on a base plate 1 by means of spring elements 2. A vibrating conveyor track 4 is interchangeably arranged on the vibrating bar 3 by means of screws 5. Workpieces 6 in the form of screws in the exemplary embodiment illustrated are conveyed on this vibrating conveyor track 4. The vibrating conveyor track 4 can be of such a form as to exercise an alignment effect on the workpieces 6. This is done by a lateral cheek 7 on the vibrating conveyor track 4 in the present case.

A trimming weight 8 is secured to the bottom side of the vibrating bar 3 about in the middle of the latter's length and its position is located distinctly underneath the vibrating bar 3 by means of spacers 9.

A countermass 10 not connected with the vibrating bar 3 is arranged underneath the vibrating bar 3 to partially surround the latter laterally. The countermass 10 consists of two partial countermasses 11, 12 arranged one after the other in the longitudinal direction of the vibrating bar 3 and joined together by means of a joining web 13. This countermass 10 is likewise supported in relation to the base plate 1 by way of spring elements 14 of the same type as the spring elements 2.

An electromagnet vibratory drive 15 is arranged between the vibrating bar 3 and the countermass 10. An armature 16 of the vibratory drive 15 is arranged on an armature holder 17, which is secured to the bottom side of the vibrating bar 3 by means of fastening screws 18. A vibratory magnet 19 of the vibratory drive 15 has a magnet coil 20 having a soft iron core 21 arranged inside. The vibratory magnet 19 is secured to the partial countermass 11 of the countermass 10 by way of a holder 22 of the vibratory magnet 19. The countermass 10 and in particular its partial countermass 11 leaving only an extremely small air gap towards the vibrating bar 3, the magnetic path from the armature 16 to the vibratory magnet 19 is closed by way of the holder 22, the partial countermass 11, the vibrating bar 3 and the armature holder 17.

While the vibratory drive 15—referred to the conveying direction 23 of the vibroconveyor—is arranged above the trimming weight 8, a coupler 24 is provided underneath the trimming weight 8, the coupler 24 having a coupler case 25 capable of performing torsional vibrations about an axis 26 extending horizontally and at right angles to the conveying direction 23. To this end, the coupler case 25 is positioned on a coupler holder 27 which is directly or indirectly jointed to the base plate 1 by means of fasteners 28. By means of connecting rods 29, 30 extending parallel to the conveying direction 23, the coupler case 25 is linked with the countermass 10 on the one hand and with the vibrating bar 3 on the other so that these forcibly vibrate reciprocally referred to the conveying direction 23.

Figure 2:
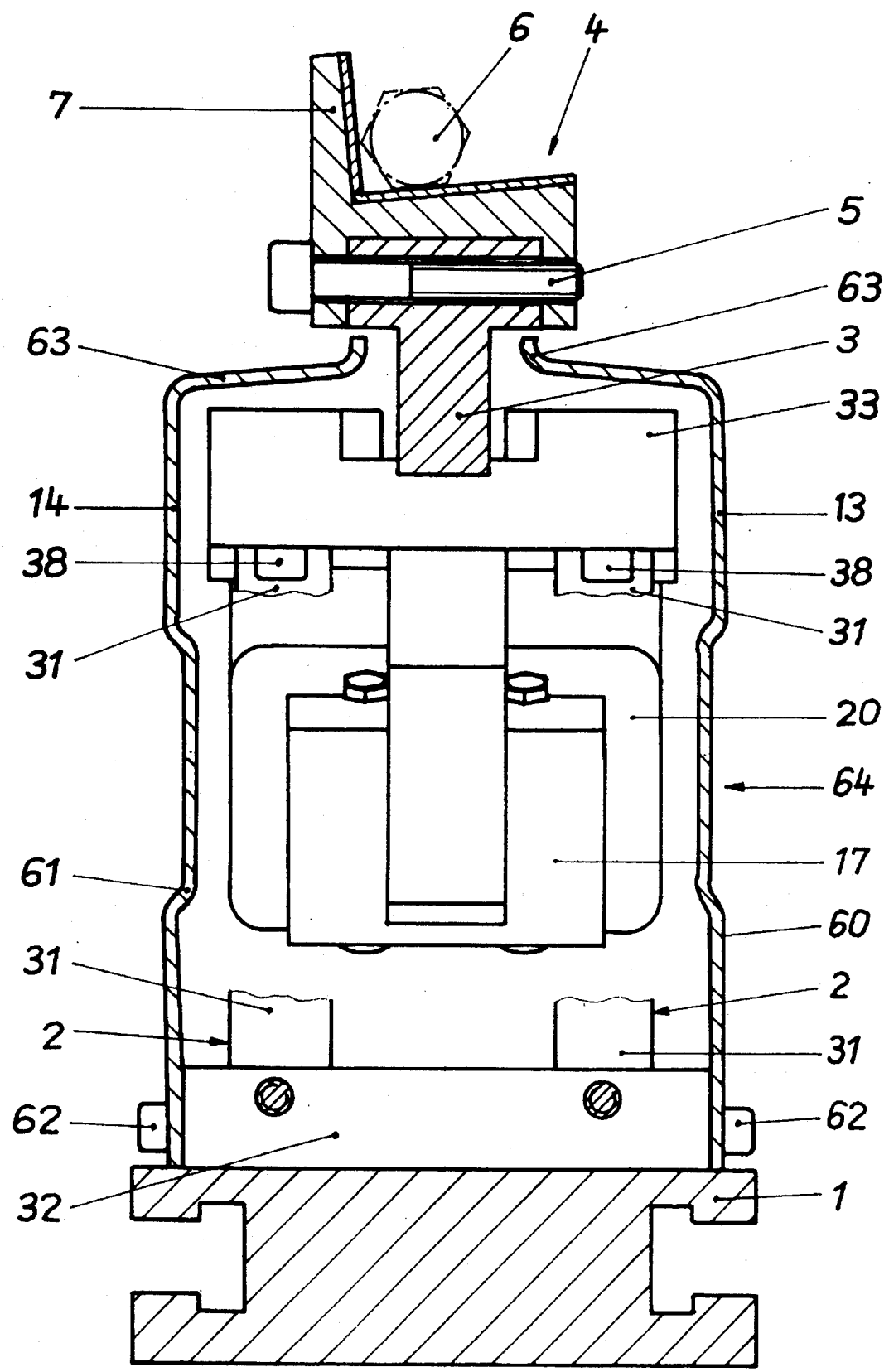
FIG. 2 is a lateral front view of the linear vibratory conveyor in accordance with the arrow II of FIG. 1 with the front wall being removed in a partial sectional illustration.
Figure 3:
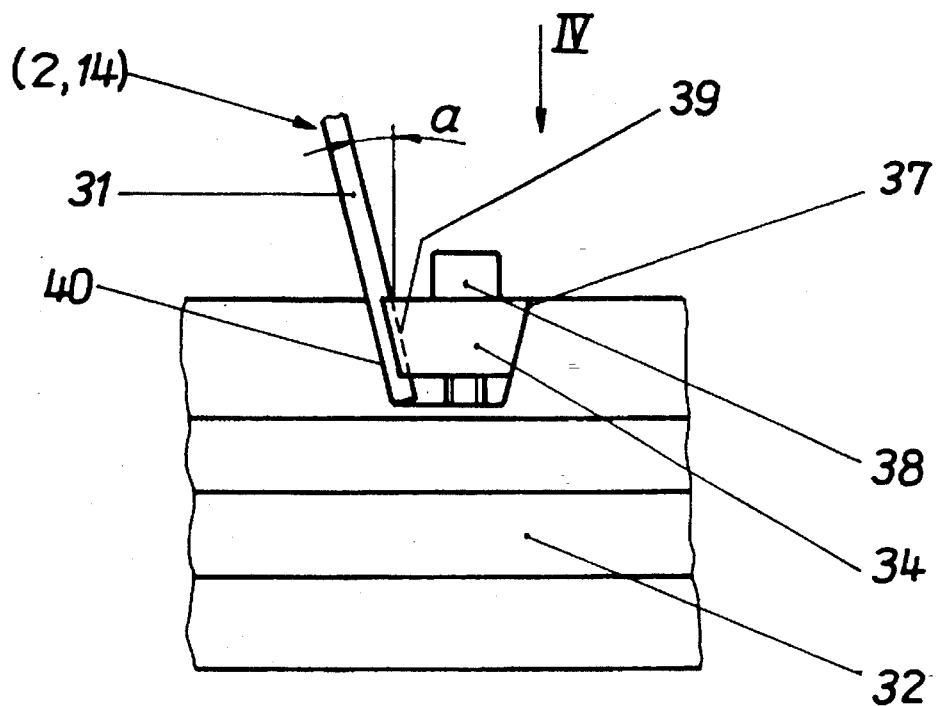
FIG. 3 is a lateral view of an attachment of a leaf spring.
Figure 4:
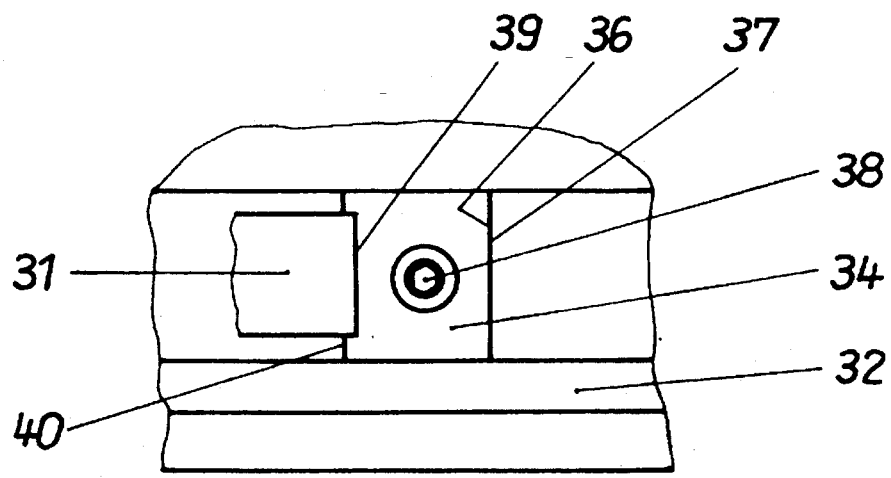
FIG. 4 is a plan view of the attachment of the leaf spring in accordance with the arrow IV of FIG. 3.

Being formed by leaf springs 31, the spring elements 2 and 14 are alike in length, cross-section and material. The lower end of each of these leaf springs 31 is joined to a bottom plate 32 which is again arranged on the base plate 1. The upper end of each of the leaf springs 31 is linked to a holder 33 connected to the vibrating bar 3 or to the countermass 10, respectively. In all cases the assembly of the leaf springs 31 takes place by means of a clamping wedge 34 disposed in a trapezoidal recess 35 of the bottom plate 32 or a holder 33 or the countermass 10, respectively. A guide surface 36 of each clamping wedge 34 supports itself on a bearing surface 37 of the recess 35. The clamping wedge 34 is displaceable on the bearing surface 37 of the recess 35 by means of a clamping screw 38, so that a pressure surface 39 opposite to the guide surface 36, of the clamping wedge 34 changes in distance to an associated clamping surface 40 of the recess 35. The respective end of the leaf spring 31 is clamped between this pressure surface 39 of the clamping wedge 34 and the clamping surface 40 of the recess 35. As outlined in FIG. 2, two leaf springs 31 at a time are arranged at a distance from each other on a plane at right angles to the conveying direction 23, so that the vibrating bar 3 on the one hand and the countermass 10 on the other are retained laterally stable. FIGS. 3, 4, 5 and 8 illustrate how the clamping of the leaf springs 31 is configured. As seen in FIGS. 1 and 3, all the leaf springs 31 of the spring elements 2 and 14 are arranged in parallel to each other, and in relation to the bottom plate 32 and the vibrating bar 3 and the countermass 10, respectively, they are inclined by an angle a to which $11° \leq a \leq 17°$ applies, the angle a preferably being approximately 14°.

Figure 5:
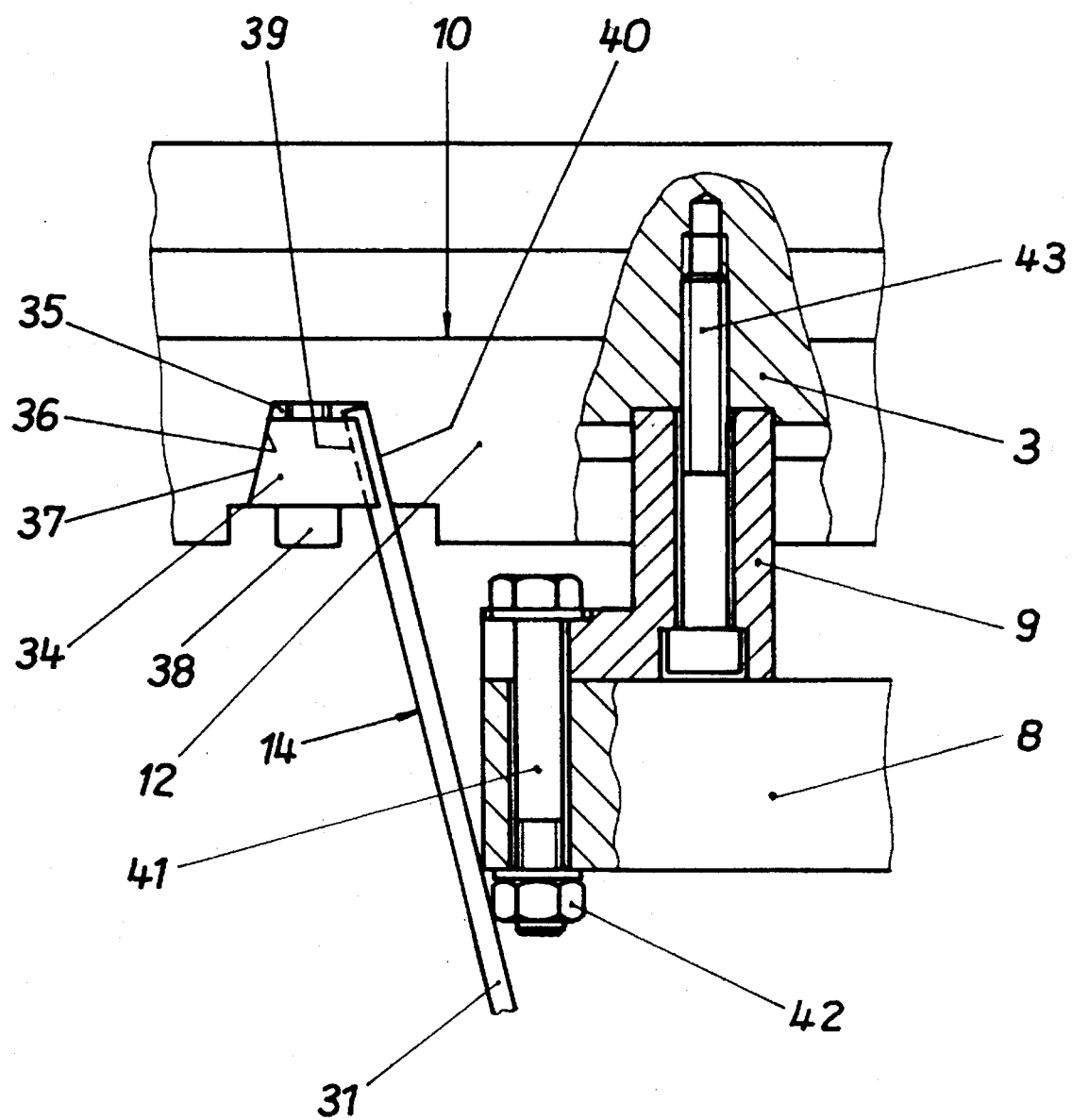
FIG. 5 is a lateral view of an attachment of a trimming weight on a vibrating bar.

Details of the attachment of the trimming weight 8 on the vibrating bar 3 are shown in FIG. 5 which also illustrates the attachment of a leaf spring 31 of a spring element 14 on the partial countermass 12 of the countermass 10. Accordingly, the trimming weight 8 is secured to the spacer 9 located above by means of retaining screws 41 and nuts 42. The spacer 9 is again fastened to the vibrating bar 3 by means of screws 43. As seen in FIG. 5, the trimming weight 8 can readily be replaced by a trimming weight 8 of different weight, there being the possibility of the distance from the vibrating bar 3 being varied by the interchange of the spacers 9.

Figure 6:
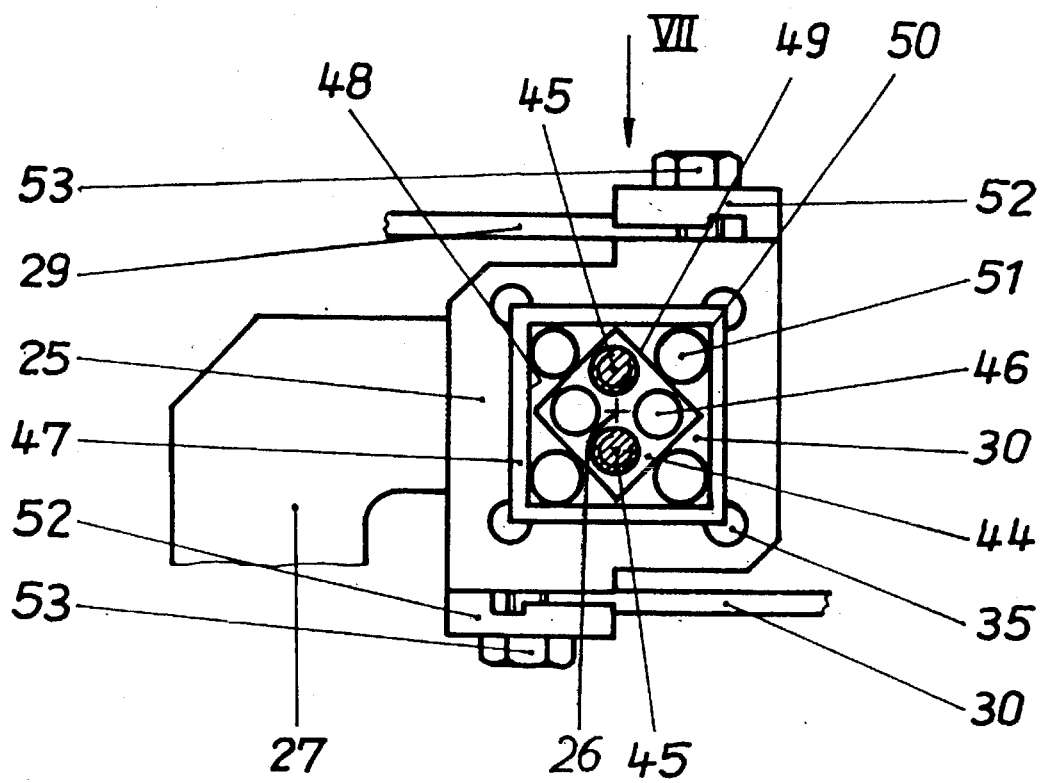
FIG. 6 is a lateral view of a coupler.
Figure 7:
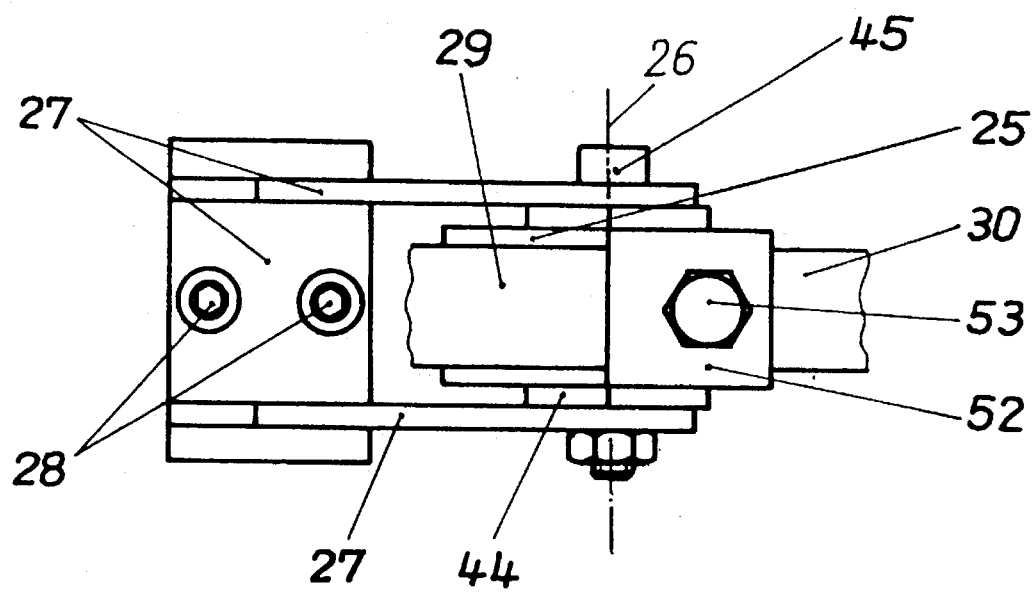
FIG. 7 is a plan view of the coupler in accordance with the arrow VII of FIG. 6.
Figure 8:
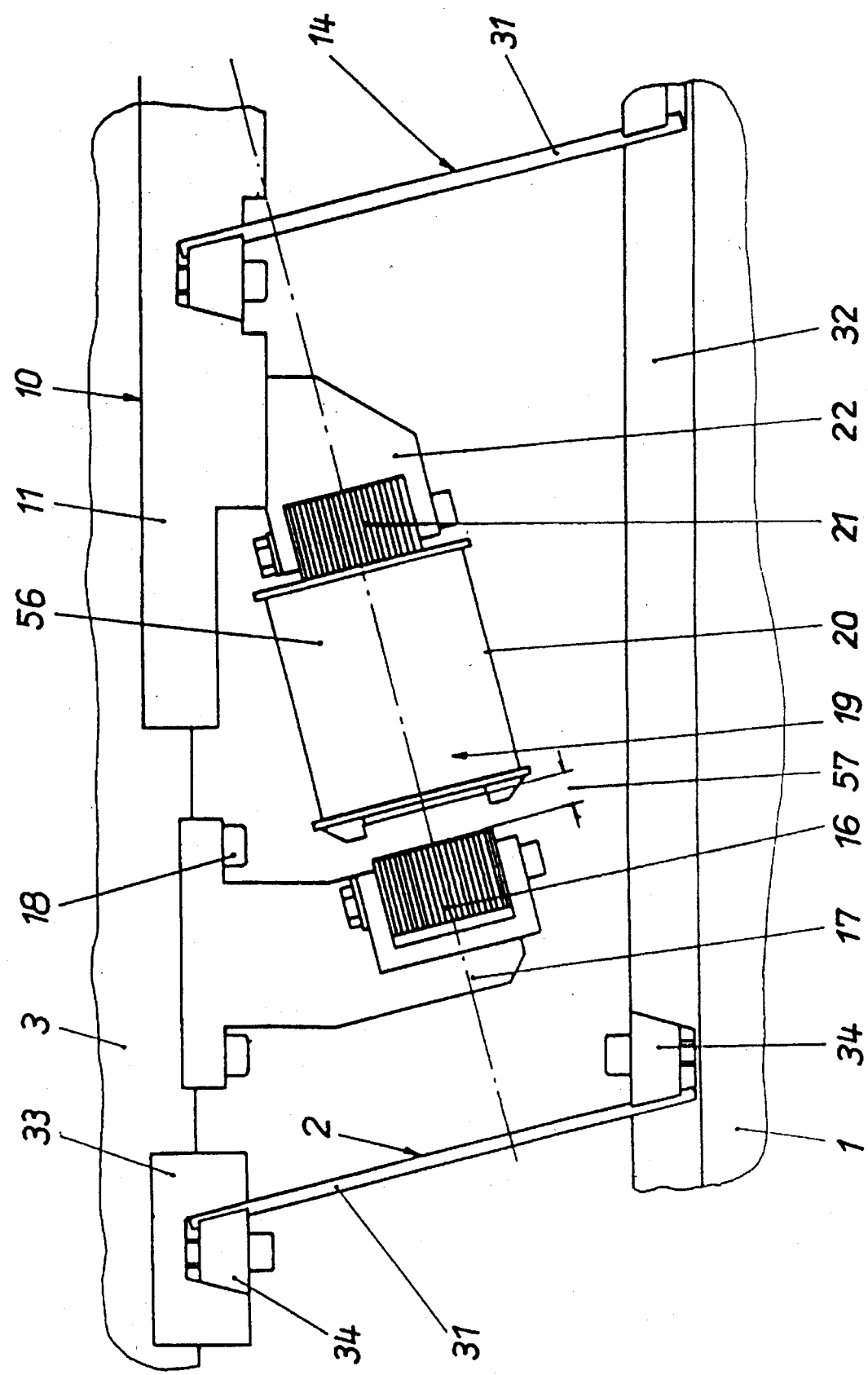
FIG. 8 is a lateral longitudinal view of a vibratory drive on a larger scale.

The details of the coupler 24 become apparent from FIGS. 6 and 7. An abutment 44 of a square outer cross-sectional shape is arranged on the coupler holder 27 by means of assembly screws 45, the abutment 44 and the assembly screws 45 extending in parallel to the axis 26 of the coupler 24. The abutment 44 is made partially hollow by drillholes 46. The abutment 44 of square cross-sectional shape is encased by a shell 47 of the coupler case 25, which has a square inner cross-sectional shape and is likewise oriented in parallel to the axis 26. The insides 48 of the shell 47 have a length slightly exceeding the length of the diagonal of the abutment 44. The abutment 44 and the shell 47 are rotated one relative to the other by 45° referred to the axis 26, so that the outsides 49 of the abutment 44 face the inner corners 50 of the shell 47. Compression spring elements 51 of elastically deformable material, preferably rubber, which may have a cylindrical shape, are arranged in the inner edges 50. They support themselves on the insides 48 of the shell 47 in the vicinity of the latter's inner corners 50 and on the central portion of the outsides 49 of the abutment 44. Any pivoting of the coupler housing 25 about the axis 26 referred to the stationary abutment 44 will result in the compression spring elements 51 being deformed and exercising a restoring force on the coupler housing 25 in the direction of its position of rest shown in FIG. 6. On the other hand, the compression spring elements 51 damp this motion by reason of the distinct absorption properties of rubber. The connecting rods 29, 30 are each linked with the coupler case 25 by means of a clamping member 52 and a clamping screw 53. By means of fasteners of the same type they are joined to abutment lugs 54, 55 which are secured to the countermass 10 on the one hand and to the vibrating bar 3 on the other. The configuration of the coupler 24 not only produces the positive coupling of the vibrating bar 3 and the countermass 10, but also results in an almost noiseless and wear-resistant coupling.

The vibrating bar 3 comprising the holders 33, the vibrating conveyor track 4 with the trimming weight 8 including the spacers 9, the armature 16 with the armature holder 17, and the workpieces 6 constitute a vibrating mass M1. Another vibrating mass M2 is substantially constituted by the countermass 10 and the vibratory magnet 19 mounted on it and comprising the holder 22. Smaller components and the attachments of the leaf springs 2, 14 are negligible. The centers of gravity of the two masses M1 and M2 coincide substantially in a single common center of gravity S situated in the axis 56 of vibration of the vibratory drive 15. The approximate coinciding of the two centers of gravity of the masses M1 and M2 in a common center of gravity S is attained by the attachment of the trimming weight 8. Since the axis 56 of vibration coinciding with the central axis of the vibratory drive 15 passes through the common center of gravity S, the sum of all the forces acting on the masses M1 and M2 on the one hand, and the sum of all the torsional moments acting on the masses M1 and M2 on the other are 0. The vibrational system formed by the masses M1 and M2 vibrating reciprocally is a closed system externally neutral and free from torsional moments. Externally, it is totally steady; it does not tend to jumping, nor does it exercise any forces on the ground by way of the base plate 1 nor, in this regard, produce any noise. This is still increased by the fact that the direction of the leaf spring 31 is perpendicular to the direction of the axis 56 of vibration, i.e. the upper portions of the leaf springs 2 and 14 are deflected in the direction of the axis 56 of vibration.

The vibratory drive 15 is excited by means of a cycled rectangular d-c voltage. Driving taking place by means of a cycled d-c voltage, no energy losses and thus no heating of the magnet coil 20 will occur during the excitation breaks, so that a great air gap 57 of for instance 5 mm (cf. FIG. 8) is possible between the armature 16 and the vibratory magnet 19. Since the masses M1 and M2 vibrate reciprocally, i.e. they move towards and away from each other, one conveying step of a workpiece 6 is at maximum equal to half the vibration amplitude. By changing the frequency of the d-c potential serving for the excitation of the vibratory drive 15, infinitely variable control of the conveying speed ranging from 0 to 15 m/min is possible, to which end a frequency transformer is used. The frequency of the potential supplied by the latter determines the forced vibration frequency of the vibroconveyor. The coupler 24 ensures that all applications are covered without modification of the spring elements 2 and 14. The coupler 24 forces the masses M1 and M2 to vibrate in opposite directions not only in the case of resonance of the respective vibrating system, but also for all the other frequency ranges. As seen in FIG. 1, each vibrating mass M1 and M2 is linked with the bottom plate 32 by way of three pairs of spring elements 2 and 14, respectively. Due to their clamping fixation, the leaf springs 31 need not be weakened by holes or the like; they are not exposed to the risk of wear either.

As seen in FIG. 1, the vibroconveyor is normally disposed to be inclined in the conveying direction 23, which is, however, rather exaggerated in the illustration in FIG. 1.

For the sake of completeness, reference is made to the fact that the vibroconveyor is provided with detachable front walls 58, 59 on both its fronts. Longitudinally, it is provided with lateral walls 60, 61—as seen in FIG. 2—which are fixed on the bottom plate 32 by means of screws 62. By means of upper sections 63 bent inwards they overlap the holders 33 for the leaf springs 31 disposed on the vibrating bar 3 and engage with the vibrating conveyor track 4 from below, so that any dirt falling down from the latter cannot get inside the vibroconveyor, i.e. into the housing 64 defined by the front walls 58, 59 and the side walls 60, 61.

What is claimed is:

1. A linear fibratory conveyor comprising:

a bottom plate (32);

a vibrating conveyor track (4);

spring elements (2) disposed between the bottom plate (32) and the vibrating conveyor track (4);

a trimming weight (8) linked to the vibrating conveyor track (4) and substantially determining a first vibrating mass (M1);

a countermass (10) substantially determining a second vibrating mass (M2);

spring elements (14) arranged between the bottom plate (32) and the countermass (10);

a vibratory drive (15) formed by an electromagnetic drive engaging with the first vibrating mass (M1) on the one hand and with the second vibrating mass (M2) on the other hand; and a coupler (24) engaging between the first vibrating mass (M1) and the second vibrating mass (M2) and enforcing reciprocal vibration, wherein the coupler (24) has a coupler case (25) torsionally vibratable about a stationary axis (26) in relation to the bottom plate (32) and linked to the first vibrating mass (M1) and the second vibrating mass (M2) by way of a connecting rod (29, 30), and wherein the coupler (24) is separate from the vibratory drive (15).

2. A linear vibratory conveyor according to claim 1, wherein an axis (56) of vibration of the vibratory drive (15) is directed approximately through a common center of gravity (S) of the first vibrating mass (M1) and the second vibrating mass (M2).

3. A linear vibratory conveyor according to claim 2, wherein the axis (56) of vibration of the vibratory drive (15) extends about parallel to a direction of deflection of the spring elements (2, 14).

4. A linear vibratory conveyor according to claim 1, wherein the coupler case (25) is supported on an abutment (44) which is stationary in relation to the bottom plate (32) and wherein the coupler case (25) is torsionally vibratable in an elastically damped manner.

5. A linear vibratory conveyor according to claim 1, wherein the vibratory drive is excitable by a cycled d-c voltage.

6. A linear vibratory conveyor according to claim 5, wherein the d-c voltage is adjustable by a frequency transformer.

7. A linear vibratory conveyor according to claim 1, wherein the spring elements (2, 14) are formed by leaf springs (31) that are alike to one another.

8. A linear vibratory conveyor according to claim 7, wherein the leaf springs (31) have their full cross-sectional area at their ends and are linked with the bottom plate (32) on the one hand and with the first vibrating mass (M1) on the other hand and with the second vibrating mass (M2) on the other hand by means of a clamping equipment.

* * * * *